No. 706,726. Patented Aug. 12, 1902.
A. J. COMSTOCK.
CULTIVATOR.
(Application filed Aug. 29, 1901.)
(No Model.) 2 Sheets—Sheet 1.
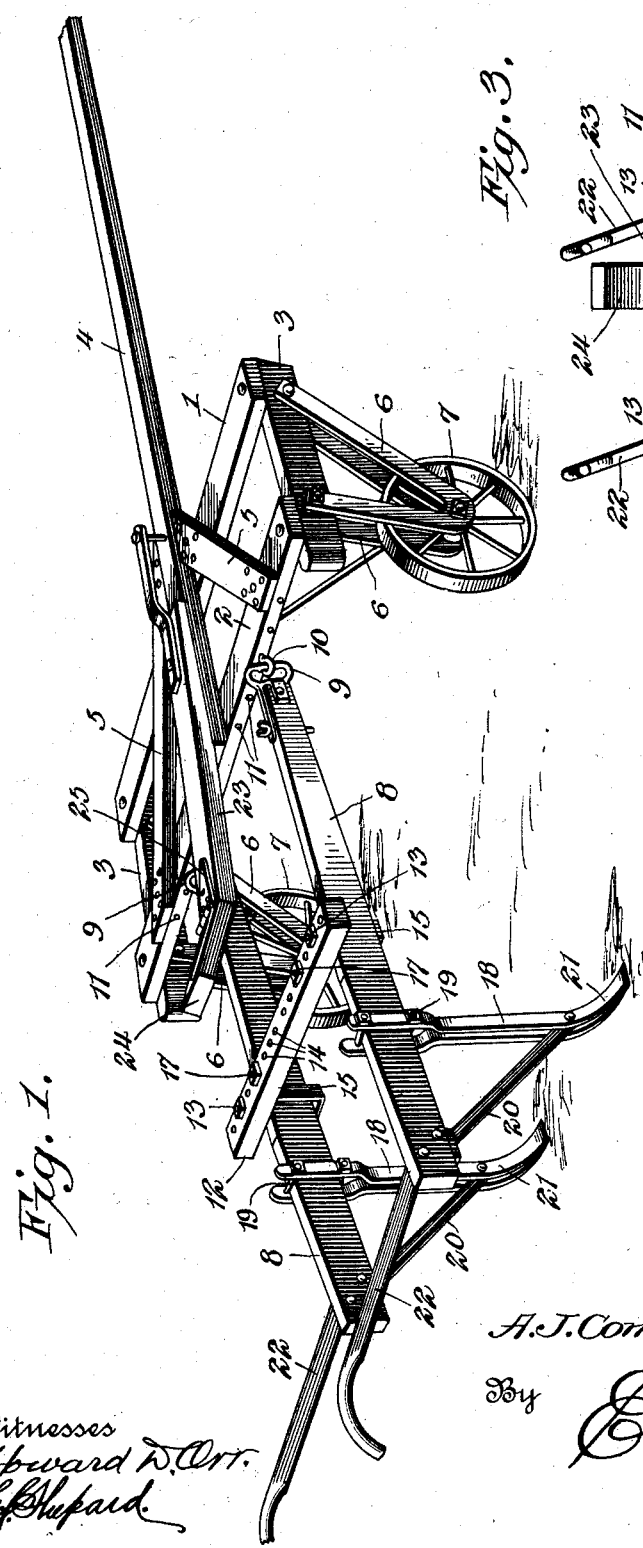
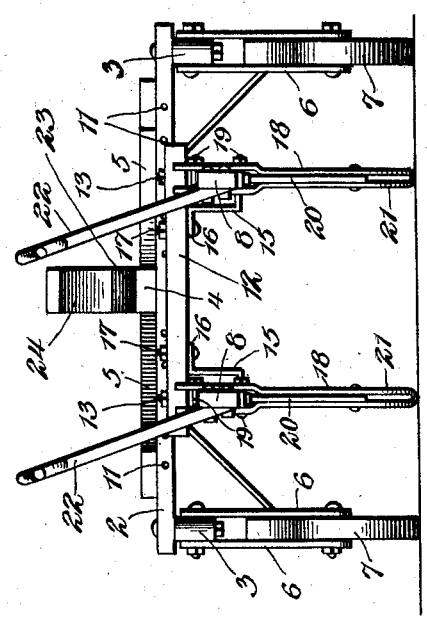
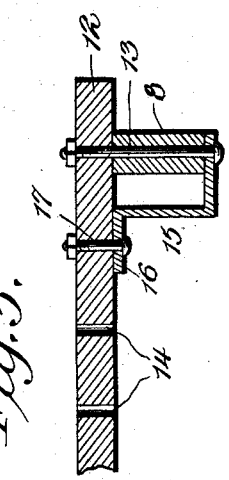
A. J. Comstock, Inventor
Witnesses No. 706,726. Patented Aug. 12, 1902.
A. J. COMSTOCK.
CULTIVATOR.
(Application filed Aug. 29, 1901.)
(No Model.) 2 Sheets—Sheet 2.
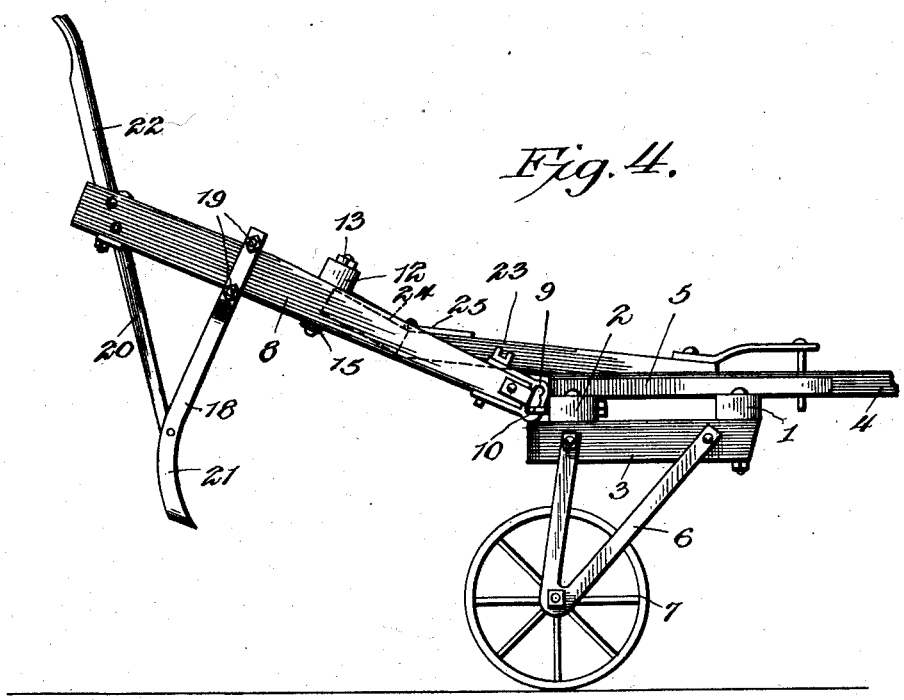
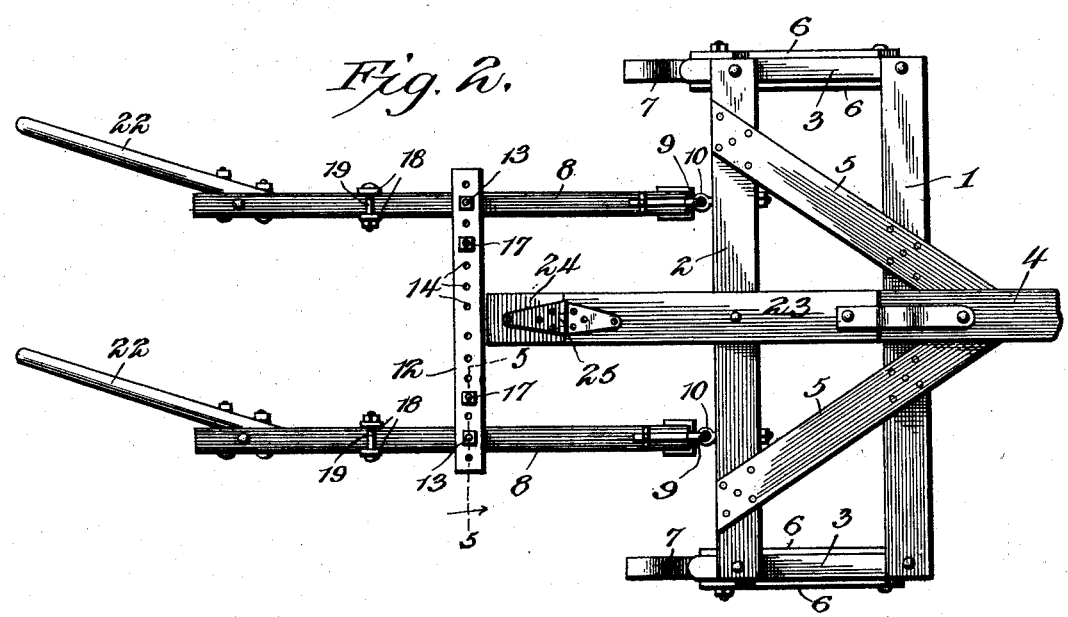
A. J. Comstock, Inventor:
Witnesses
Howard D. Orr.
H. J. Shepard
By E. G. Siggers
Attorney

UNITED STATES PATENT OFFICE.

ANDREW J. COMSTOCK, OF TYLER, TEXAS, ASSIGNOR OF ONE-HALF TO EDWARD L. BOOTH, OF TYLER, TEXAS.

CULTIVATOR.

SPECIFICATION forming part of Letters Patent No. 706,726, dated August 12, 1902.

Application filed August 29, 1901. Serial No. 73,711. (No model.)

*To all whom it may concern:*

Be it known that I, ANDREW J. COMSTOCK, a citizen of the United States, residing at Tyler, in the county of Smith and State of Texas, have invented a new and useful Cultivator, of which the following is a specification.

This invention relates to cultivators, and has for its object to provide an improved device of this character which is especially adapted for cultivating cotton. It is furthermore designed to provide a strong and durable frame structure which is also light and inexpensive and arranged to be conveniently manipulated, especially in reversing the device at the end of a row.

Another object is to construct the frame portion so as to automatically accommodate the shovels to the uneven character of the ground and to provide for the convenient adjustment of the shovel-beams, so as to accommodate the shovels to the distance between the rows of plants.

A final object resides in arranging for supporting the shovel-beams in an elevated position, so as to hold the shovels out of contact with the ground—as, for instance, when the cultivator is passing along a road—and also to facilitate the elevation and lowering of the beams without stopping the cultivator.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a cultivator constructed and arranged in accordance with the present invention. Fig. 2 is a top plan view thereof. Fig. 3 is a rear elevation of the cultivator. Fig. 4 is a side elevation showing the cultivator-beams in an elevated position. Fig. 5 is a detail sectional view taken on the line 5 5 of Fig. 2.

Like characters of reference designate corresponding parts in all the figures of the drawings.

In carrying out the present invention there is provided a wheeled frame consisting of the front and rear transverse beams 1 and 2, which have their corresponding ends connected by means of the respective sills 3, that lie beneath the beams and are connected thereto by suitable fastenings. A draft-tongue 4 has its rear end secured to the intermediate portions of the upper sides of the transverse beams and is furthermore secured by means of the inclined braces 5, that are secured to the upper side of the wheeled frame and have their forward ends connected to the opposite sides of the tongue just in advance of the beam 1. Suitable hangers 6 are suspended in pairs from the opposite sills 3, and between the members of each pair of hangers there is mounted a traction-wheel 7. In rear of the wheeled frame there is provided a plurality of substantially parallel and longitudinally-disposed shovel-beams 8, two such beams being shown in the drawings, although any preferred number of beams may be employed. The forward end of each beam is provided with an ordinary clevis 9, which is loosely connected to an eyebolt 10, that passes through the rear transverse beam 2 and is adjustable longitudinally thereof by reason of the longitudinal series of perforations 11, formed through the beam. By this loose connection the beams are capable of swinging movements in both horizontal and vertical directions. About midway of the lengths of the shovel-beams there is provided a connecting cross-bar 12, which rests upon the tops of the beams and is adjustably connected thereto by means of the terminal bolts 13, that pierce the bar and the respective beams. The purpose of this bar is to brace the beams and maintain the same at a predetermined distance apart, and this distance may be regulated by means of the adjustable connections between the forward ends of the beams and the wheeled frame, the connections between the beams and the cross-bar also being correspondingly adjustable by reason of the longitudinal series of perforations 14, which are formed vertically through the connecting-bar.

Upon reference to Fig. 5 of the drawings it will be seen that each end of the connecting-bar is braced by means of a substantially L-shaped bracket 15, that has its lower horizontal member applied to the under side of the adjacent shovel-beam and connected thereto by means of the fastening 13, the opposite upright member of the bracket being provided with an outwardly-directed ear 16, that is applied flat against the under side of the connecting-bar, to which it is connected by means of a bolt 17. It will be understood that the brackets are arranged at the inner sides of the respective shovel-beams, so as to obviate projections at the outer sides thereof, the brackets also being adjustable with the beam by means of the series of perforations in the connecting-bar.

In rear of the connecting-bar each shovel-beam is provided with a substantially U-shaped shovel-standard 18, which has its opposite upper ends placed astraddle of the beam and secured thereto by means of transverse bolts 19, which pierce the opposite sides of the standard and snugly embrace the top and bottom sides of the beam, there being an upwardly and rearwardly inclined brace 20 extending from the lower portion of the standard to the rear end portion of the beam, the lower end of the brace being secured between the opposite sides of the standards. The lower end of the standard is curved or bowed forwardly, as indicated at 21, so as to form a foot, to which may be applied any common or preferred form of cultivator-shovel. Each cultivator-beam is provided with a handle member 22, which is secured to the rear end of the beam, and both handles are inclined transversely in the same direction, so that the operator may walk upon even or unplowed ground.

A shovel-frame support is provided in the nature of a bar 23, that is secured upon the rear end portion of the draft tongue or pole and is projected upwardly and rearwardly beyond the wheeled frame and is also terminated short of the cross-bar that connects the shovel-beams. To the outer or rear end of this bar there is adjustably connected a bar member 24 by means of an ordinary strap-hinge 25, applied to the upper sides of the bar members, whereby the adjacent ends thereof, which are correspondingly beveled or inclined, are adapted to abut, and thereby normally support, the member 24 in an upwardly-inclined direction, with its rear end located in the upward path of the connecting-bar 12. To support the shovel-frame in an elevated position, as indicated in Fig. 4 of the drawings, the movable support member is thrown over upon the top of the fixed bar and the shovel-frame is elevated so as to permit of the part 24 being returned to its normal position, after which the frame is lowered until the connecting-bar 12 rests upon the part 24, whereby the shovel-frame is conveniently and effectually supported in an elevated position, so as to hold the shovels out of contact with the ground. When lowered into its operative position, it is merely necessary to reverse the just-described operation, as will be understood.

As heretofore described and also illustrated in Fig. 5 of the drawings, the body portion of each brace 15 is disposed inwardly from the adjacent beam, so as to give sufficient play to the latter when it is swung laterally upon its loose connection with the wheeled frame and to prevent binding of the brace upon the beam, whereby the latter is free to move laterally for a considerable extent.

What I claim is—

1. In a cultivator, the combination of a wheeled frame, a shovel-frame loosely connected thereto and capable of being swung vertically thereon, and shovel-frame-supporting means carried by the wheel-frame and capable of being moved out of the path of the shovel-frame to permit of vertical movement of the latter and then capable of movement into engagement with the shovel-frame to support the same in an elevated position.

2. In a cultivator, the combination of a wheeled frame, a shovel-frame having a loose connection with the wheeled frame and capable of being swung vertically thereon, and a vertically-swinging shovel-frame support hinged to the wheeled frame, the rear free end of the hinged support lying in the upward path of a portion of the shovel-frame, and being capable of an upward and forward swinging movement to a position out of the path of the shovel-frame to permit of an upward movement of the latter, and then capable of a return movement to its original position to underlie a portion of the shovel-frame and support the same in an elevated position.

3. In a cultivator, the combination with a wheeled frame, of a plurality of shovel-beams loosely connected to the frame, a cross-bar connecting the beams, and a two-part supporting-bar carried by the wheeled frame and having a hinged connection between the parts thereof, the adjacent ends of these parts being beveled and normally bowed to dispose the outer member in an upwardly-inclined position, said movable member being located in the upward path of the bar which connects the shovel-beams.

4. In a cultivator, the combination with shovel-beams, and a cross-bar to connect the same, of a substantially L-shaped bracket having one end applied across the adjacent beam, and its opposite end provided with a laterally-projected ear applied to the cross-bar, a fastening piercing the cross-bar, the beam and the adjacent end portion of the bracket, and another fastening connecting the ear to the cross-bar.

5. The combination with a wheeled frame, of a shovel-beam loosely connected thereto, and a two-part supporting-bar carried by the wheeled frame and having a hinged connection between the parts thereof, the outer part being free and arranged in the path of the shovel-beam for the purpose substantially as described.

In testimony that I claim the foregoing as my own I have hereto affixed my signature in the presence of two witnesses.

ANDREW J. COMSTOCK.

Witnesses:
A. MORGAN DUKE,
JAS. T. GARNETT.